Dec. 19, 1944.  H. S. KEATING  2,365,277

MATERIAL HANDLING APPARATUS

Filed May 6, 1943

INVENTOR
H.S. KEATING
BY
E.R. Nowlan
ATTORNEY

Patented Dec. 19, 1944

2,365,277

UNITED STATES PATENT OFFICE 2,365,277

MATERIAL HANDLING APPARATUS

Herbert S. Keating, North Plainfield, N. J., assignor to Western Electric Company, Incorporated, New York, N. Y., a corporation of New York Application May 6, 1943, Serial No. 485,875

8 Claims. (Cl. 57—17)

This invention relates to material handling apparatus, and more particularly to serving heads for serving strands on an advancing core.

In the manufacture of electrical conductors, various problems arise with the necessary changes in the structures depending upon the conditions to which the conductors are to be subjected. In the present instance it is desirable to form an electrical conductor which has, between its final insulating cover or covers and the conductor core, servings of strands spaced accurately and uniformly so that weatherproofing or other liquid materials may surround the strands and thoroughly impregnate them. With variations in the size of the conductor the spacing of the strands may also vary as they are applied thereto. It has, therefore, been found advantageous to accurately guide the strands to assure desired spacing thereof on the core and to make possible variations in the spacing where such is desired.

An object of the invention is to provide a material guide which is simple in structure yet highly accurate in assuring spaced servings of material on an advancing core.

With this and other objects in view, the invention comprises a material guiding apparatus having individual adjustable elements formed to separately guide lengths of material served to an advancing core to accurately and variably space the individual materials on the core.

Figure 1:
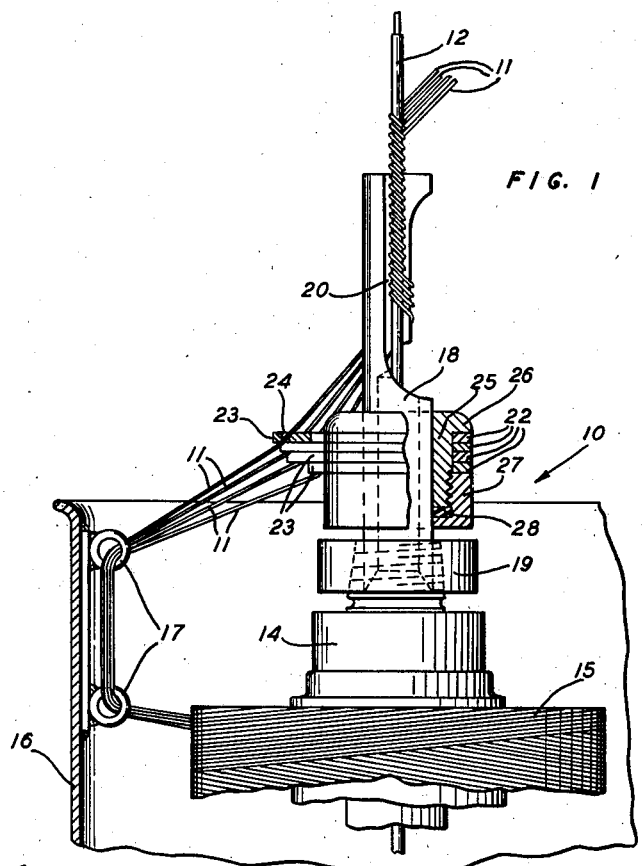
Figure 2:
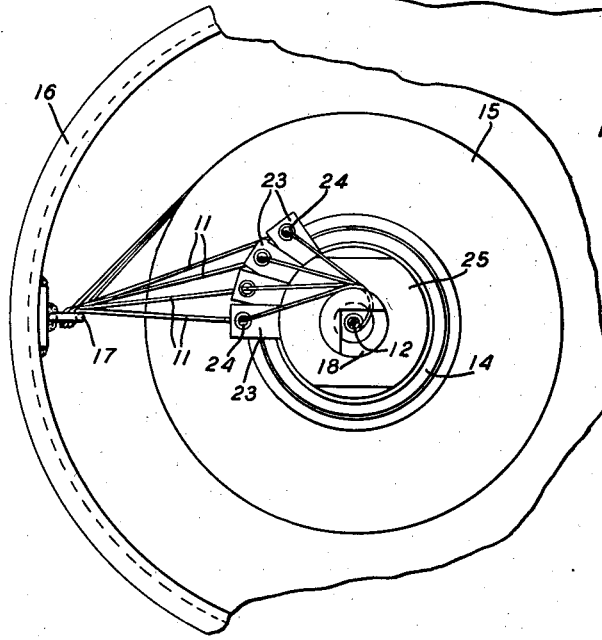

Other objects and advantages will be apparent from the following detailed description when considered in conjunction with the accompanying drawing, wherein Fig. 1 is a fragmentary front elevational view of the apparatus, a portion thereof being shown in section, and Fig. 2 is a fragmentary top plan view of the structure shown in Fig. 1.

Referring now to the drawing, it will be observed that numeral 10 designates generally a serving unit which is rotated counterclockwise (Fig. 2) to cause serving of a plurality of ends of material 11 on an advancing core 12. The serving unit includes a rotatable support 14 for a supply 15 of material, all of which rotates with and is disposed in a cup 16. Eyelets or suitable guides 17 are provided to guide the ends 11 of the material as they pass from the supply 15 toward the core 12. In the present instance the material is composed of only four ends or threads withdrawn from the supply and served to the core or conductor 12. It should be understood that this number of ends may vary, if so desired. The structure including the support 14 and a serving element 18, is hollow for the longitudinal advancement of the core therethrough. The element 18 is held in place in the support 14 by a suitable coupling 19 and is of the contour shown to support the core at a serving portion 20 and also guide the material or ends 11 thereto.

The means to bring about the spacing of the material, namely the ends 11, includes a plurality of spacing elements 22 annular in general contour and having integral projections 23 extending outwardly as illustrated, for example, in Fig. 2. In these projections are disposed apertures 24, with rounded surfaces to permit free passage of the ends 11 therethrough without causing damage to the ends. The spacing elements 22 are disposed concentric with a sleeve 25, an integral flange 26 of which extends over the general portions of the elements and cooperates with a threaded member 27 to hold the spacing elements in place. The threaded member 27 threadedly engages a portion of the sleeve 25, as illustrated in Fig. 1, and supports a resilient washer 28, the purpose of the latter being to secure this structure including the guiding elements, the sleeve and the member 27 to the element 18. Movement of the sleeve 25 and member 27 together will cause compression of the washer to force its inner portion into intimate engagement with the element 18.

During the operation of the apparatus the entire unit 10 is rotated relative to the core 12 during the advancement of the core at a given speed. During this operation the ends 11, in being wrapped spirally about the core at the serving portion 20, will cause advancement of the ends, paying off at the supply 15 which is allowed to rotate relative to its support 14. The ends 11, therefore, pass through the eyelets 17 to their respective apertures 24 which, as illustrated, are spaced given distances apart and are at different levels comparable with the spacing of their respective leads on the core. Thus the topmost end 11 will pass through the topmost guide element or aperture 24 and in their successive orders the subsequent leads will pass through their lower elements. The vertical position of the spacing elements 22, particularly their apertures 24, with respect to each other assists in the spacing of the ends or threads upon the core. If desired, spacers may be disposed between the elements to further vary the spacing of the threads. However, the relative spacing of the apertures 24 about the axis of the core has greater effect in varying the spacing of the ends of the material on the core. Thus the guiding elements may be adjusted relative to each other by relative movement of the sleeve 25 and member 27 to allow for this adjustment, to bring about wider or closer spacing of the ends.

With this structure the accurate location of each end of material is assured and with little effort and without dismantling or re-threading the apparatus, adjustments may be made to vary the spacing in the material on the core. It will be apparent by viewing Fig. 1, that any fluid material which may be placed over the served threads on the core or conductor may readily pass into the core through the spaces between the ends of material. The covered core resulting from this apparatus is not complete. Preferably, another serving of spaced threads will be disposed over those shown but in the opposite direction, leaving openings for a weatherprofing material in both servings. Also, one or more coverings of insulating material may be added to complete the article. However, only that structure necessary to illustrate the invention has been chosen.

Although specific improvements of the invention have been shown and described, it will be understood that they are but illustrative and that various modifications may be made therein without departing from the scope and spirit of this invention as defined by the appended claims.

What is claimed is:

1. A material handling apparatus comprising a serving element rotatable about an advancing core to serve strands to the core, a supply of strands to be served, guides disposed radially with respect to the core to individually guide the strands to spaced positions on the core, and means to support the guides and clamp them in desired variable positions relative to each other to vary the spacing of the strands on the core.

2. A material handling apparatus comprising a hollow serving head rotatable about an advancing core and having means to rotatably support a supply of strands, a serving element to cause spiral winding of the strands about the core, and elements disposed radially with respect to the core and mounted for adjustment relative to each other to individually guide the strands to variably spaced positions on the core.

3. A material handling apparatus comprising a hollow serving head rotatable about an advancing core and having a supply of strand material including a group of strands, means to rotatably support the supply, a serving element to cause spiral winding of the strands about the core, and elements disposed radially with respect to the core and mounted for adjustment relative to each other to separate the strands and individually guide them to variably spaced positions on the core.

4. A material handling apparatus comprising a hollow serving head rotatable about an advancing core and having a supply of strand material including a group of strands, means to rotatably support the supply, a serving element to cause spiral winding of the strands about the core, and elements extending radially about the core at different locations longitudinally of the core to separate the strands and respectively guide them to similarly spaced locations on the core.

5. A material handling apparatus comprising a hollow serving head rotatable about an advancing core and having means to rotatably support a supply of strands, a serving element to cause spiral winding of the strands about the core and support the core against deflection at the winding portion, and guide elements disposed at different positions longitudinally of the serving element to individually guide the strands to spaced positions on the core and in their respective order.

6. A material handling apparatus comprising a hollow serving head rotatable about an advancing core and having means to rotatably support a supply of strands, a serving element to cause spiral winding of the strands about the core and support the core against deflection at the winding portion, guide elements disposed at different positions longitudinally of the serving element to individually guide the strands to spaced positions on the core and in their respective order, and means adapted to support the guide elements in their respective positions for rotation with the serving element.

7. A material handling apparatus comprising a hollow serving head rotatable about an advancing core and having a supply of strand material including a group of strands, means to rotatably support the supply, a serving element to cause spiral winding of the strands about the core, guides having apertured projections extending radially of the core to separate the strands and respectively guide them to spaced positions on the core, and means to mount the guides in stacked formation on the serving element and for individual adjustment of the guides about the core to cause variation in the spacing of the strands on the core.

8. A material handling apparatus comprising a hollow serving head rotatable about an advancing core and having a supply of strand material including a group of strands, means to rotatably support the supply, a serving element to cause spiral winding of the strands about the core, apertured guides disposed concentric with the serving element and having projections extending radially of the core and formed to separate the strands and respectively guide them to spaced positions on the core, and means to mount the guides in stacked formation on the serving element and for individual adjustment of the guides about the core to cause variation in the spacing of the strands on the core.

HERBERT S. KEATING.